United States Patent

[11] 3,537,540

| [72] | Inventors | Paul J. Zuppiger, and Athenaz, and Gabriel Bouladon, St. Loup, Versoix, Switzerland |
|---|---|---|
| [21] | Appl. No. | 766,168 |
| [22] | Filed | Oct. 9, 1968 |
| [45] | Patented | Nov. 3, 1970 |
| [73] | Assignee | MacGregor-Comarain Paris, France a company of France |
| [32] | Priorities | Oct. 13, 1967 |
| [33] |  | Switzerland |
| [31] |  | 14,361/67; Sept. 19, 1968, France, 166,760 |

[54] HANDLING DEVICE
14 Claims, 25 Drawing Figs.

[52] U.S. Cl. .................................................. 180/8, 198/1
[51] Int. Cl. ............................................... B62d 57/02
[50] Field of Search ........................................ 180/8, 7; 198/1, 108

[56] References Cited
UNITED STATES PATENTS

| 2,714,011 | 7/1955 | Albee | 180/9 |
| 2,942,676 | 6/1960 | Kraus | 180/8 |
| 3,150,733 | 9/1964 | Goebel | 180/8 |
| 3,297,125 | 1/1967 | Pool et al. | 198/1 |
| 3,327,832 | 6/1967 | Kyle | 198/1 |

Primary Examiner—Leo Friaglia
Attorney—Kenyon and Kenyon, Reilly Carr and Chapin ABSTRACT: The handling device for the transportation of loads is of the type comprising inflatable chambers interposed between the load and the ground. The device comprises two substantially parallel surfaces, one of which is adapted to receive the load, and the other is adapted to bear upon the ground. Said chambers are interposed between said two surfaces, which are linked at articulation points by inextensible members. Means for sequentially inflating or deflating said chambers and means controlling, in the deflated state of the said chambers, the shifting of the said surfaces with respect to one another insure the motion step by step of the device.

Patented Nov. 3, 1970

INVENTORS
PAUL J. ZUPPIGER
GABRIEL BAUDADON

BY Kenyon + Kenyon
ATTORNEYS

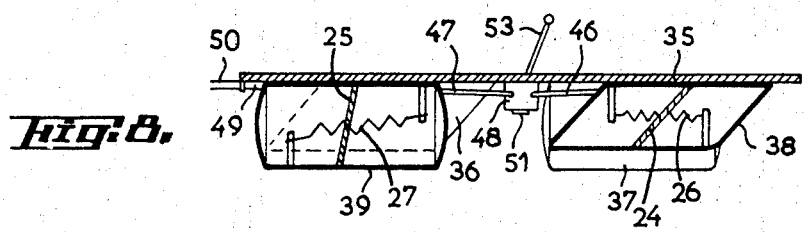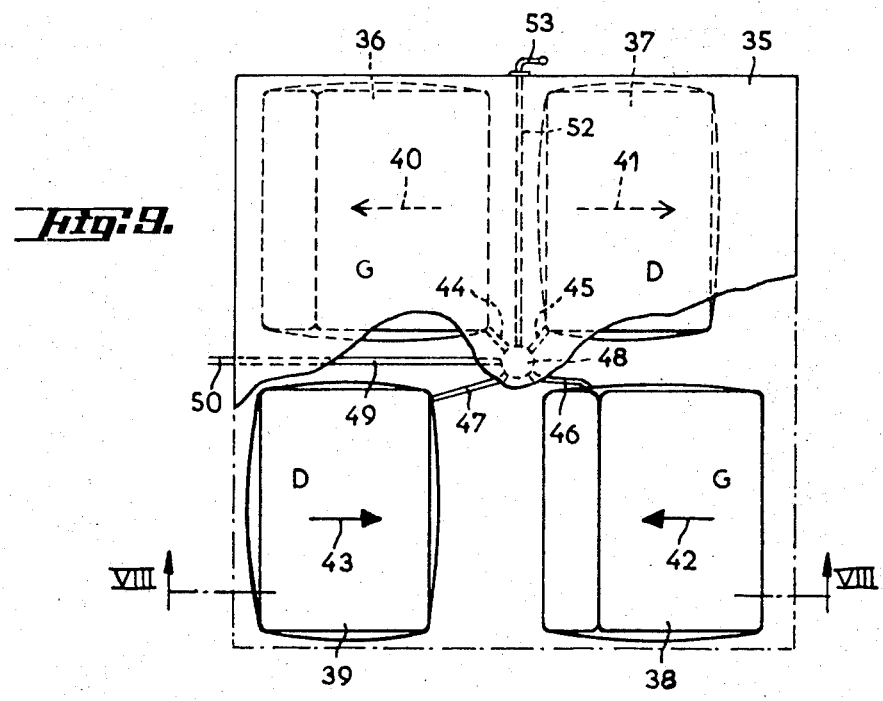

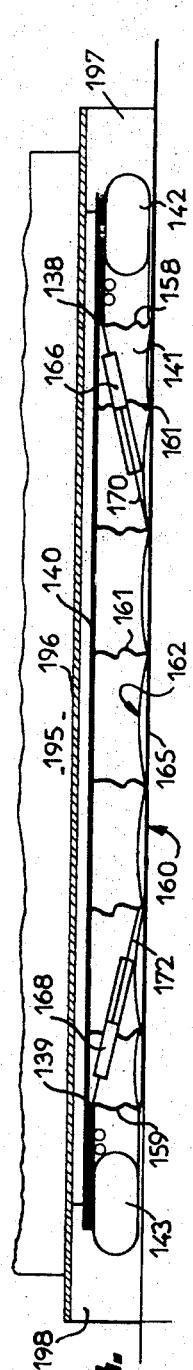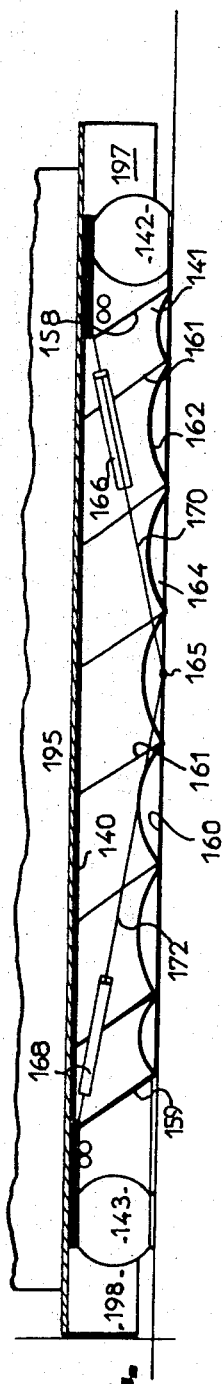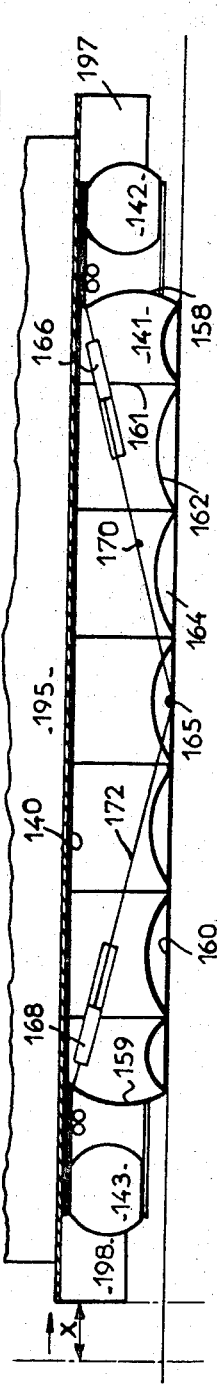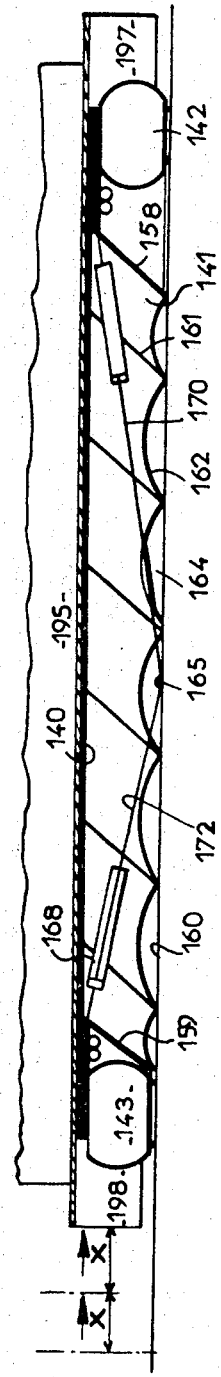

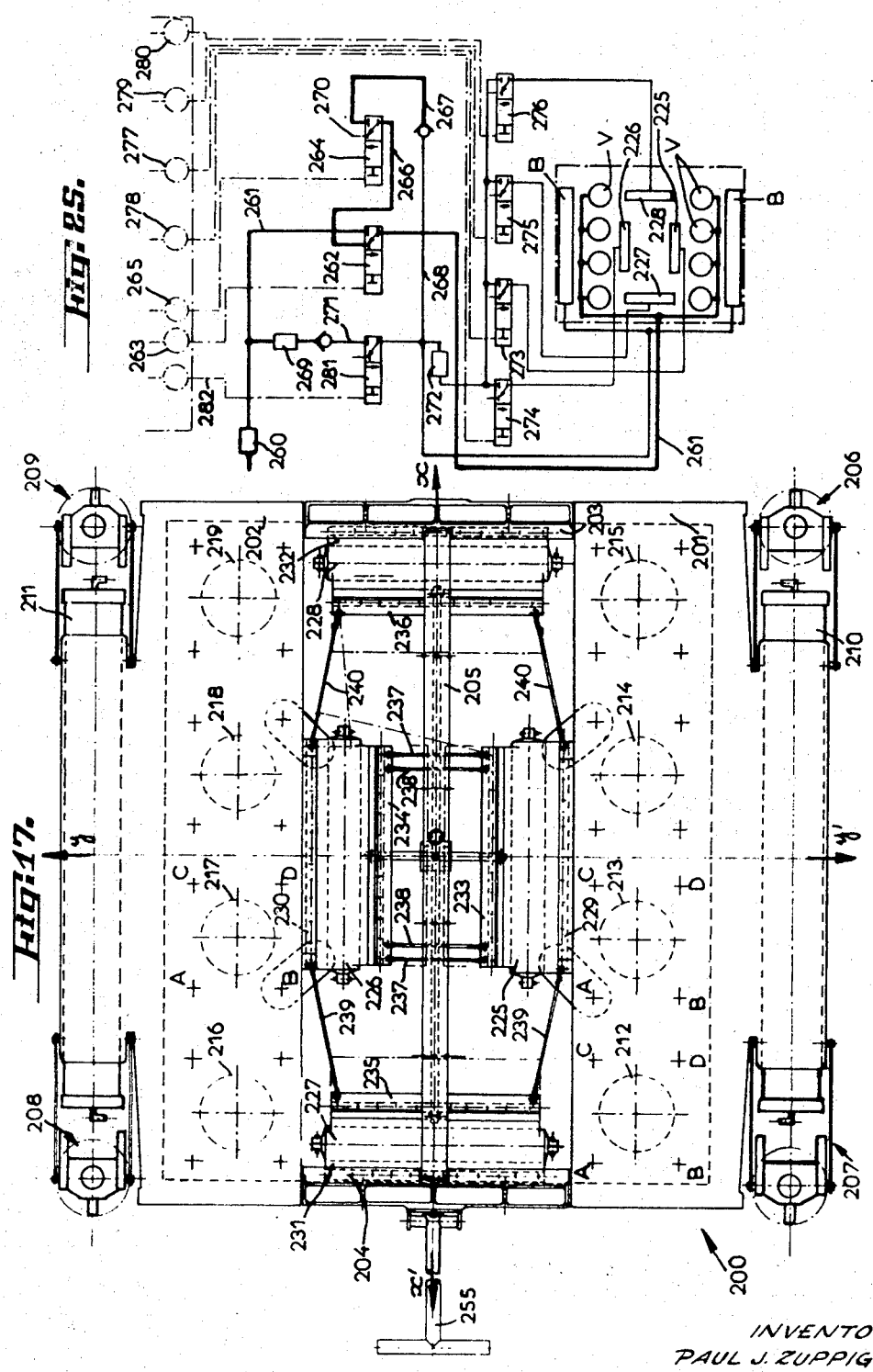

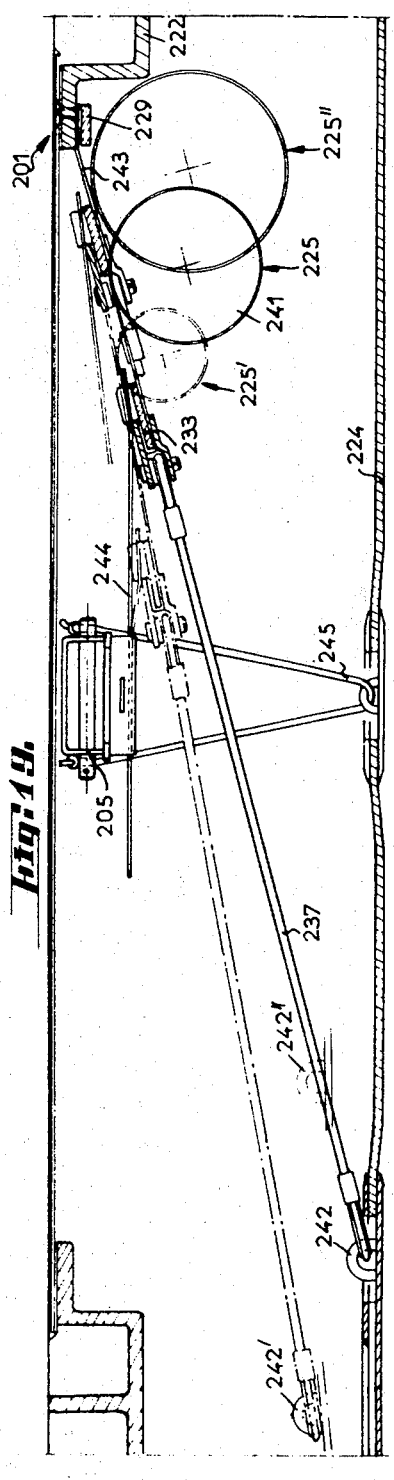
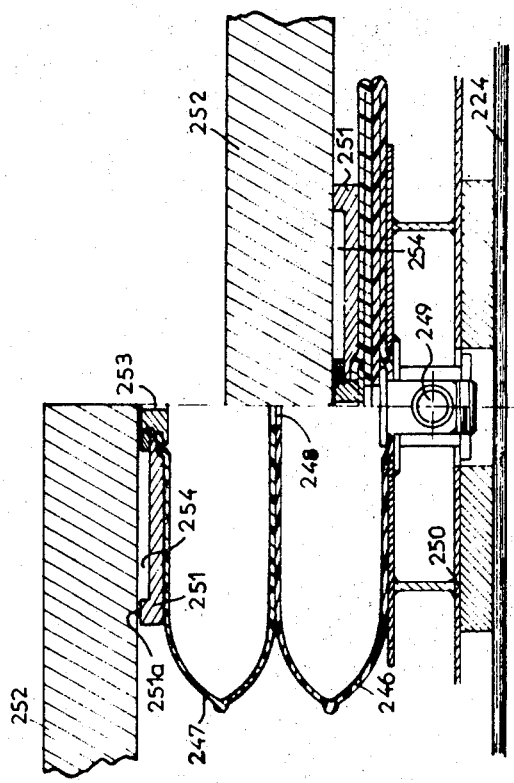

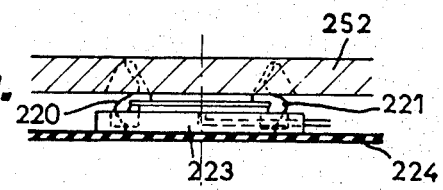
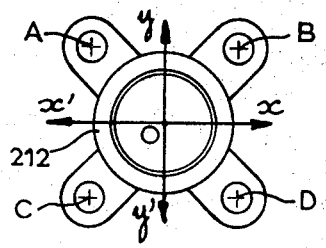
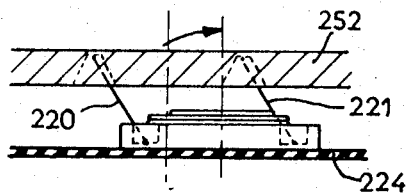
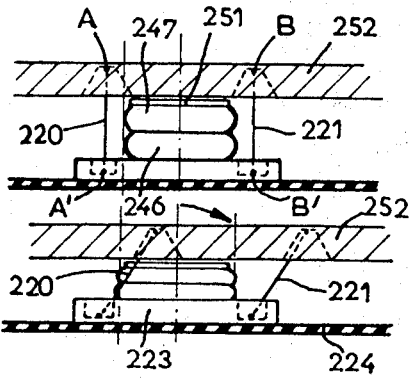

HANDLING DEVICE

The present invention relates essentially to a handling device adapted to transport a load step by step at a small distance from the ground.

The problem of the transportation of heavy loads by translation is not recent and has already been solved in various ways. For instance it is known to use one or more inflatable enclosures interposed between a load and the ground and serving as deformable rolls on which the load is rolled. This solution may be very useful when the surface of the ground is uneven (rocky), since the enclosure or enclosures compensate for the irregularities of the ground owing to their deformability; or, alternatively, when the soil is irregular from the point of view of its resistance (boggy soil), since the enclosure or enclosures distribute the weight of the load over a large surface and reduce the pressure exerted on the ground to a very low value. However, such a device is disadvantageous in that it only carries the load without propelling it; therefore, separate auxiliary means are necessary to ensure propulsion. One solution consists in holding the handling device by means of a holding vehicle, a cable or any other traction apparatus. In other known devices a rotary motion can be imparted to the enclosures by some means forming part of the handling device itself. However, these driving means must be constructed in a very special way, since the rolls constituted by the enclosures are deformable and owing to the fact that these rotary deformable enclosures must communicate with a source of pressurized fluid and, therefore, rotary joints must be used.

Other solutions consist in using a set of walking legs which move down while simultaneously slanting, then assume an upright position and then move down again while simultaneously slanting in the opposite direction, and these operations are repeated to propel the load by a process somewhat similar to the walk of an animal. In addition to the difficulties arising from the purely mechanical construction of the said walking legs, such a device while allowing to move a load even on an uneven ground does not compensate for the irregularities of the surface of the ground, but instead imparts them to the load and the latter rolls and pitches during translation. On the other hand, the weight of the load is transmitted through the ends of the legs, so that the stress on the ground is always a localized stress at a relatively high pressure. As a result, such handling devices are not suitable in particular for moving loads on soft ground.

Both the above mentioned solutions result in a considerable increase in the overall dimensions of the load and handling device as a whole. In fact, either the distance between the load and the ground must be great, this being the case when the handling device provided with rotary inflatable enclosures or walking legs is placed under the load, or the dimensions of the load and handling device as a whole in the horizontal direction exceed those of the load, as is the case when the walking legs or the inflatable enclosures are placed laterally. Therefore such handling devices are hardly suitable for compact arrangement of loads in confined spaces, or for arrangement of containers in warehouses or ship holds.

Accordingly, the object of the invention is to provide a handling device avoiding the difficulties of known devices. The device according to the invention is characterized in particular in that it comprises:

at least one chamber capable of being inflated or deflated and interposed between a load and the ground;

at least two substantially parallel surfaces, one of which is adapted to receive a load, whereas the other bears upon the ground;

inextensible means connecting the said two surfaces at articulation points or the like; and means which in the deflated state of the said chamber control the shifting of the said surfaces with respect to one another through the shifting of the articulation points with respect to one another.

The invention also relates to a load handling and displacement method at a small distance from the ground, the said method being characterized in that:

between the load and the ground is interposed a device comprising a support surface for the load and a surface adapted to bear upon the ground, said surfaces being linked by means of inextensible links, and inflatable chambers which, when inflated, move the said surfaces apart;

the said bearing surface is made to slip on the ground under the said support surface in the desired direction of displacement;

the said chambers are inflated to move the said surfaces apart and lift the load, the said bearing surface resting upon the ground and the support surface being displaced along an arc of a circle while the said links are stretched; and the said chambers are then deflated while the said support surface is prevented from backward motion with respect to the said bearing surface.

Other features and advantages of the invention will appear more clearly from the following detailed description of several embodiments given only by way of example with reference to the appended drawings, in which:

FIGS. 1 and 2 are respectively a cross-sectional view and a fragmentary top plan view of a simplified embodiment of the invention;

FIGS. 3 to 6 schematically illustrate the operation of the handling device of FIGS. 1 and 2, whereas FIG. 7 shows the trajectory described by a point on the load;

FIGS. 8 and 9 are respectively a cross-sectional view taken along the line VIII–VIII of FIG. 9 and a fragmentary plan view of another embodiment of the invention;

FIGS. 13 to 16 diagrammatically illustrate the operation of another embodiment;

FIG. 17 is a top view of another embodiment;

FIG. 18 is a detailed view of the lifting members of the handling device;

FIG. 19 is a detailed view of the traction means controlling the motion of the handling device in one direction;

FIGS. 20 to 24 are diagrams illustrating the principle of operation of the handling device shown in FIGS. 17 to 19;

FIG. 25 is a diagram of a control system for the handling device.

Figure 1:
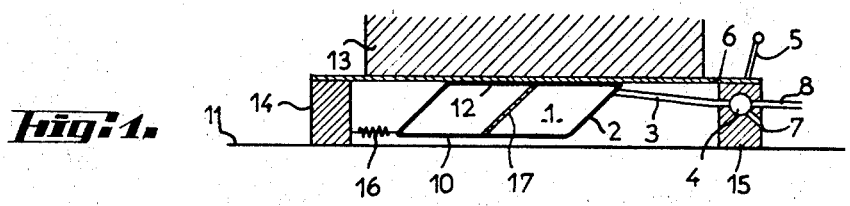
Figure 2:
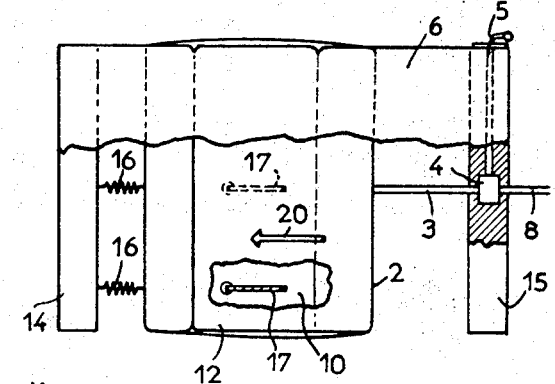

In a simplified embodiment illustrated in FIGS. 1 and 2, the handling device comprises a deformable chamber 1 defined by a fluid-tight flexible enclosure 2 connected by a pipe 3 to a three-way valve 4 controlled by a lever 5. The valve 4 connects the pipe 3 to either an exhaust port 7 or an inlet pipe 8 connected to a source (not shown) of pressurized fluid. The lower face 10 of the enclosure 2 can rest upon the ground 11, whereas the upper face 12 of the enclosure is adapted to receive a load 13 through the medium of a support platform 6 resting upon legs 14, 15. Springs 16 link the lower left hand edge (as viewed in FIG. 1) of the enclosure 2 to the leg 14 and thereby tend to retain the chamber 1 in the subsided or flattened position shown in FIG. 1 the cross section of the chamber in that position being in the shape of a parallelogram. Faces 10 and 12 are articulated or jointed to one another by means of inextensible members 17 such as cables.

Figure 3:
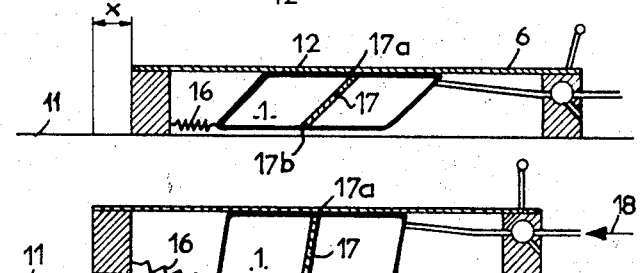
Figure 4:
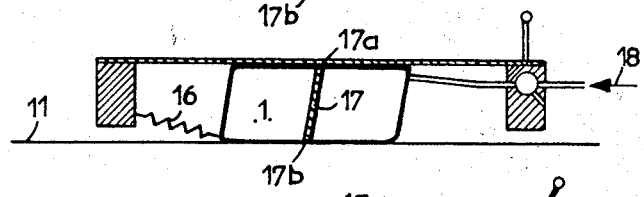
Figure 5:
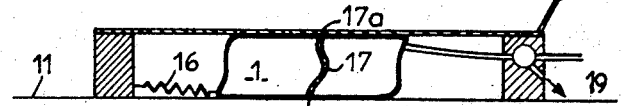
Figure 6:
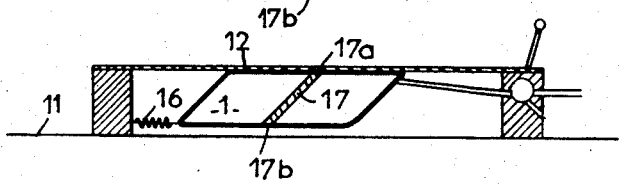
Figure 7:
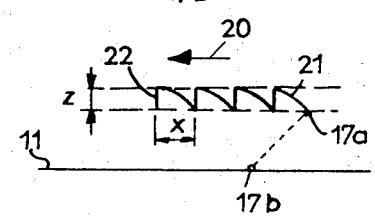

The handling device is operated as follows. At the start of a cycle the chamber 1 is deflated. The springs 16 then cause the subsided chamber to assume the shape shown in FIG. 3. Upon admission of the pressurized fluid (in the direction of the arrow 18), the chamber 1 inflates, the lower face 10 of the enclosure 2 engaging the ground; this inflation causes the upper face 12 to rise together with the platform 6 and the load, whereupon the handling device assumes the position shown in FIG. 4. This rising motion is accompanied by a shifting of the upper face 12 with respect to the lower face 10 due to the fact that the member 17 is inextensible and articulated on the faces 10 and 12 at 17a and 17b respectively, whereby as the faces 10 and 12 move apart the articulation 17a can only describe a circle lying in a vertical plane and centered at the articulation 17b. After the position shown in the FIG. has been attained, the fluid is allowed to escape from the chamber 1 (in the direction of the arrow 19); the enclosure 2 is then flattened by the load to cause the legs 14 and 15 to rest on the ground again, whereby the cables 17 slack as shown in FIG. 5. Further deflation of the chamber causes the lower face 10 to slip on the ground owing to the action of the springs 16 and to assume the end of cycle position shown in FIG. 6. This end of cycle position is similar to the start of cycle position except for a translation $\vec{x}$ (FIG. 3). It will thus be seen that by repeating similar cycles a point on the handling device, for instance the articulation 17a of the inextensible member 17, describes a cyclical translation with respect to the ground in the direction of the arrow 20, that is to say a translation in the vertical plane in which the inclination of the cable 17 varies. As schematically illustrated in FIG. 7 this translation is accompanied in each cycle by an "oblique" up motion 21 (in fact an up motion along an arc of a circle with a radius equal to the length of the cable 17) followed by a vertical down motion. Therefore the handling device is capable of transporting a load along a path extending in the plane in which the inclination of the cable varies, each translation $\vec{x}$ following upon a raising z of the load.

Of course the chamber 2 may be constructed in different ways. For instance its lower and upper faces may be composed of rigid panels around which a flexible wall may be sealingly fixed, whereby the panels and flexible wall form as a whole an enclosure defining the chamber.

Further a certain amount of filling mass may be enclosed in the chamber to reduce the volume of fluid to be injected each time to inflate the chamber.

In an alternative embodiment of the invention illustrated in FIGS. 8 and 9, the handling device comprises the platform 35 substantially square in shape and secured to four deformable chambers 36, 37, 38, 39 similar in construction to the chamber 2 and provided with inextensible members such as 24, 25 (FIG. 8) and return springs such as 26, 27. The four chambers are arranged in two pairs 36, 38 and 37, 39 respectively, the inextensible members and return springs thereof being directed so that the parallel and same directions of the translatory motions 40, 42 which can be obtained by successively inflating and deflating the chambers 36, 38 are opposed to the parallel and same directions of the translatory motions 41, 43 which can be obtained by successively inflating and deflating the chambers 37, 39. Further, each pair of chambers 36, 38 and 37, 39 is arranged diagonally across the platform 35 so as to prevent the tilting of the platform carrying a load. The four chambers are connected by pipes 44 to 47 to injection means comprising a multiple valve 48 fed through a pipe 49 from a pressurized fluid source 50, an exhaust port 51 being provided to allow the fluid to escape when it is desired to deflate the chambers. The multiple valve 48 is operated by means of a lever 53 through a shaft 52.

Designating by D a pair of chambers 37, 39 capable of imparting a translation to the right (see FIG. 9) and by G a pair of chambers 36, 38 capable of causing a translation to the left, it will be seen that if the chambers G are inflated by operating the lever 53 a translation $\vec{x}$ to the left is achieved together with an oblique up motion in a way similar to that described in conjunction with FIGS. 1 to 7. The handling device and its load are then supported by the chambers G, the chambers D being suspended in the subsided state under the platform 35. If thereafter the chambers D are inflated and then the chambers G are deflated (FIG. 8), the handling device and its load will rest upon the chambers D and the chambers G will subside under the platform 35. By deflating thereafter the chambers D at a relatively slow rate the latter will subside and the platform 35 will be simultaneously urged to the left in a further translation x by the action of the return springs 27 of the chambers D.

It will be seen that after the chambers D are deflated a position similar to the initial position is obtained wherein all the chambers are subsided under the platform. In other words, if the meaning "inflated" is given to the letters which are not overlined and the meaning "deflated" is given to the overlined letters, a series of successive cycles $G\,\overline{D}\,\overline{G}\,D$ will allow to obtain a translation to the left accompanied in each cycle by an oblique up motion followed by an oblique down motion. Also, it will be seen that a series of successive cycles $D\,G\,\overline{D}\,\overline{G}$ will lead to a translation to the right. It should be noted that in the embodiment shown in FIGS. 8 and 9, the return members 26, 27 are located inside the chambers, not outside as in the previous embodiment.

Thus the embodiment illustrated in FIGS. 8 and 9 provides a translation which is reversible, although it takes place in one direction only. The handling device is therefore reversible unidirectional although each chamber considered separately is irreversible unidirectional.

Many modifications of the constructions of the return members for bringing the chambers to the subsided state, for example springs, fluid-actuated means, etc., and of the inextensible members for articulated connection, for example cables, rigid rods, etc., can be used.

For instance if inextensible members in the form of rigid bars are used, the lower and upper faces, respectively, of the handling device are articulated in a similar way as the opposed parallel faces of a deformable parallelogram. In this case, any displacement of the load takes place along an arc of a circle with a radius equal to the length of the rigid members used for the articulated connection.

Therefore, if the chamber is inflated at a rapid rate, it will tend during deflation to subside to a position symmetrical to the initial position, so that the relative displacement of the upper face with respect to the lower face during each cycle of inflation and deflation will be twice as much as the displacement obtained in the previous embodiments. However, if in the subsided position the rigid bar cannot be returned under the handling device so as to make the lower face slip on the ground, such a chamber by itself will not be capable of imparting a translation to the load and will have to this end to be used in a handling device provided with a multiplicity of chambers.

In the embodiments described hereabove, the inextensible members are located inside the chambers. It is however obvious that they may be arranged outside the chambers or even, eventually, they may be made integral with the chamber.

The embodiment shown in FIGS. 1 to 7 relates to an irreversible unidirectional handling device, whereas FIGS. 8 and 9 illustrate an embodiment wherein the handling device is reversible unidirectional.

It is obvious that by superposing or juxtaposing such devices, for instance two devices of the type shown in FIGS. 8 and 9, the directions of translation of which are orthogonal, a reversible bidirectional device can be obtained.

Figure 10:
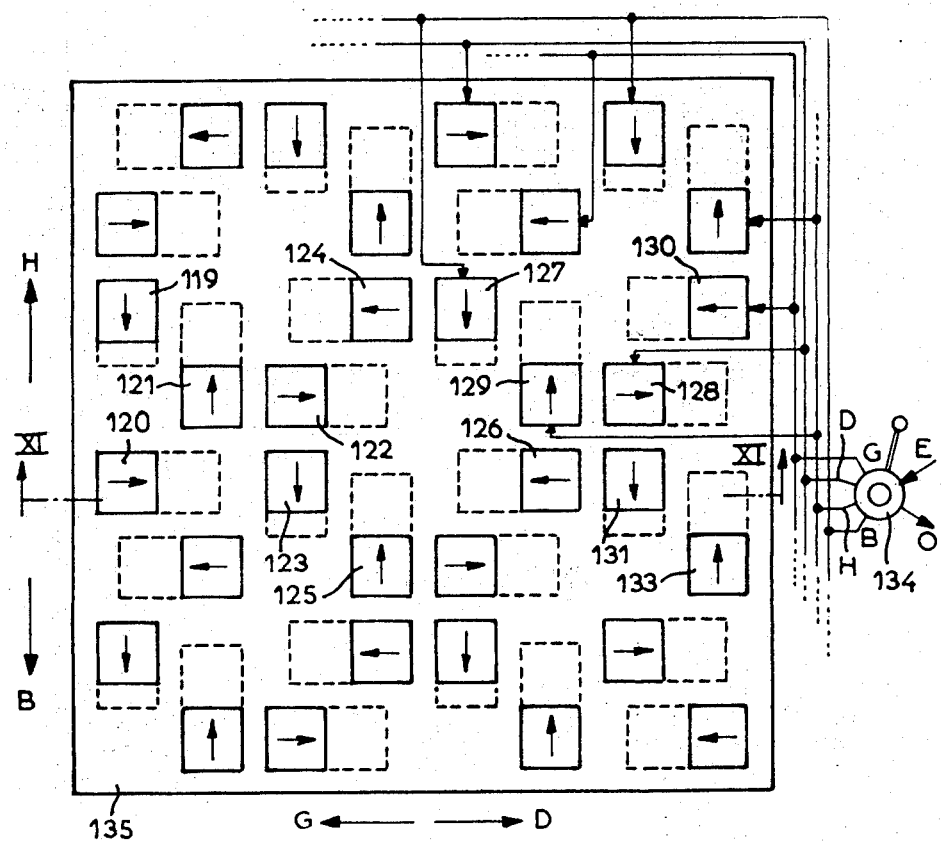
FIGS. 10 and 11 are diagrammatical views of another embodiment seen from above and in section along the line XI–XI of FIG. 10.
Figure 11:
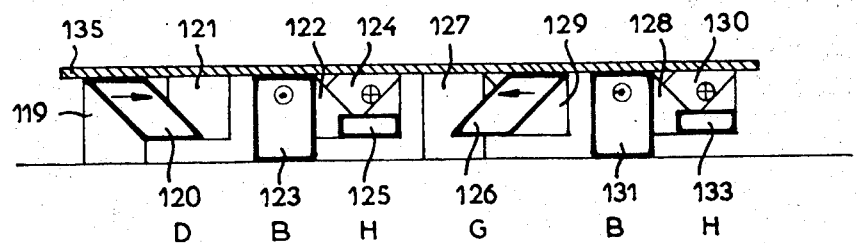

Referring to FIGS. 10 and 11, there is schematically illustrated a device comprising a plurality of irreversible unidirectional chambers the directions of displacement of which are mutually perpendicular as indicated by the arrows denoted on each of them. In fact the device comprises two sets of irreversible chambers, one set being composed of chambers such as 120, 122, 124, 126, 128 and 130 the directions of displacement of which are parallel to a horizontal direction on the drawing, and the other set comprising chambers such as 119, 121, 123, 125, 127, 129, 131, 133 the directions of displacement of which are perpendicular to those of the first set, that is to say parallel to a vertical direction on the drawing. The chambers of one and the same set are in turn arranged in two groups, the chambers of one group being adapted to move in a given direction (for instance the chambers of one group of the first set, such as the chambers 120, 122, 128 of the group D = Right, are adapted to move to the right and the chambers of one group of the second set, such as the chambers 121, 125, 129, 133 of the group H = Up, are adapted to move upwards), whereas the chambers of the other group are adapted to move in the opposite direction (for instance the chambers 124, 126, 130 of the group G = Left of the first set and the chambers 119, 123, 127, 131 of the group B = Down of the second set). The chambers of both groups are substantially equal in number and distributed almost uniformly under a common platform 135 to which they are fixed by their upper faces. All the chambers of one and the same group are interconnected by a pipe so that they can be inflated simultaneously, the four pipes leading to four outlets G (Left), D (Right), H (Up), B (Down), of a multiple valve 134 provided with an inlet E for connection to a source (not shown) of pressurized fluid and with an exhaust port O. The valve is adapted to allow inflation and deflation of the chambers of each group of chambers according to a selected sequence determining the direction of translation of the handling device. Thus, using the same symbols as in FIGS. 8 and 9, a sequence $BH\overline{B}\overline{H}$ will cause a displacement downwards (as viewed in the FIG.), a sequence will cause a displacement upwards, a sequence $HB\overline{H}\overline{B}$ will cause a displacement to the right, a sequence $DG\overline{D}\overline{G}$ will cause a displacement to the left. Various types of multiple valves capable of repeatedly performing the said sequences, depending on the position of their control, are available.

Thus the device illustrated in FIGS. 10 and 11 is capable of moving by successive steps, each step being directed in one or the other of two orthogonal directions and being accompanied by an up motion or a down motion, both of which are oblique.

Figure 12:
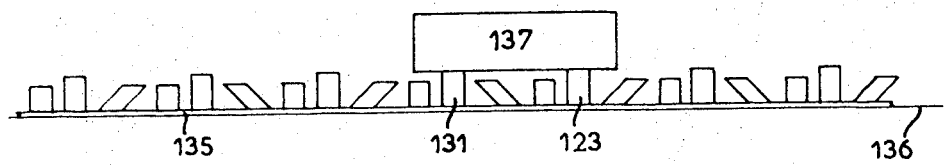
FIG. 12 shows a modification resulting from another embodiment of a handling device such as illustrated in FIGS. 10 and 11.

In the examples just described the load has been assumed to be resting upon the upper face or faces of the deformable chamber or chambers of the handling device, or on the platform to which the said face or faces are fixed. Consequently, the device itself moves together with the load. However the same principle of operation may be used with the handling device turned upside down, the "upper" faces of the chambers resting upon the ground (at least indirectly) and "lower" faces engaging the load. By selecting the dimensions of the device so that its area entirely covers the surface on which a load is to be moved, a fixed "propulsion conveyor" is obtained whereby the load moves in one direction or another, depending on the sequence of inflation and deflation of the chambers. FIG. 12 schematically illustrates the way in which a device such as shown in FIGS. 10 and 11, when turned upside down so that the platform 135 thereof rests upon the ground 136, is capable of moving a load 137 carried on the "lower" faces of the chambers (for instance the chambers 123 and 131).

In the embodiment illustrated in section in FIGS. 13 to 16, the handling device comprises lifting members consisting of a deformable chamber 141 and lateral bags 142, 143, all of which are inflatable. Inside the fluid-tight chamber 141 are mounted inextensible members such as cables 161 and traction means 166, 168 adapted to control the shifting of the upper face 140 of the chamber 141 in one direction or the other (to the left or to the right as viewed in the Figures) with respect to the lower surface 160 of the handling device resting upon the ground.

In the embodiment illustrated in the said Figures, the chamber 141 is limited by an upper surface 140 constituted by a rigid plate to which are sealingly assembled flexible side wall 158, 159, the latter being in turn sealingly assembled to the lower flexible surface 160 of the chamber.

The inextensible cables 161 are suitably anchored and distributed between the two surfaces 140 and 160 of the chamber. In addition, a flexible enclosure 162 defining fluid-tight cells 164 between the said enclosure and the flexible wall 160 is placed on the lower surface 160 between the anchorage points of the cables 161.

In the embodiment illustrated the traction means 166, 168 consist of pneumatically actuated means which are anchored at 138, 139 to the upper plate 140 and at 165 to the lower wall 160.

A load 195 rests upon a platform 196 supported by legs 197, 198.

The device just described is operated as follows. With the chamber 141 and the lateral bags 142, 143 in the deflated position (FIG. 13), the device is moved under the platform 196 supporting a load 195.

The lateral bags 142, 143 are then inflated until a moderate pressure of the, say, 2 kg/cm² is attained. This causes the load to rise and the legs 197, 198 to part from the ground. Simultaneously, if it is desired for instance to move the device to the right (as viewed in the FIGS.), the traction means 166 is operated to draw the anchor 165 to the right. As a result the lower surface 160 of the chamber slips on the ground to the right. Simultaneously, air is admitted into the cells 164 defined by the flexible enclosures 160 and 162. When inflated the said cells form, in a way, filling means limiting the effective or actual volume of the chamber which will have to be inflated and deflated to achieve the various successive steps of motion and illustrated in FIGS. 15 and 16. Advantageously, the bags 142, 143 and the cells 164 may be adapted to communicate.

The following phase of motion by a half a step is illustrated in FIG. 15. This is obtained by admitting air under a low pressure of, say, 300 g/cm² into the chamber 141, the cells 164 and the lateral bags 142, 143 remaining inflated at 2 kg/cm². The inflation of the chamber 141 causes the load to be raised further. Since the cables 161 are inextensible, this up motion is accompanied by a straightening of the cables 161 (with a rotary motion as described previously), the device thus accomplishing a translation $\overline{x}$ to the right. Simultaneously the cables 170, 172 bring the traction means 166, 168 back to a symmetrical position. The traction means 166 is then set to exhaust, whereas the traction means 168 is set to traction, thus tending to incline the cables 161 to the right (FIG. 16) as a result of the pull exerted on the anchor 165 by the traction means 168. Then the chamber 141 is progressively deflated to move the load down until the lateral bags 142, 143 come into contact with the ground again, this down motion being accompanied by a further translation to the right. Now it only remains for the action of the traction means 166, 168 to be reversed so as to make the lower face 160 to slip again on the ground to the right, whereby the whole structure assumes a position similar to the position illustrated in FIGS. 14, but shifted with respect to the latter to the extent of a translation $GD\overline{G}\overline{D}$.

Such a reversible unidirectional handling device may advantageously be made reversible bidirectional by providing at least four traction means such as 166, 168 arranged symmetrically at 90° from one another, for instance around a common anchorage point 165.

The bidirectional motion may also be obtained by simply juxtaposing or superposing two devices of the type just described with directions of translation perpendicular to one another.

Referring to FIGS. 17 to 25, there is illustrated an improved embodiment of the handling device according to the invention.

In this embodiment the handling device 200 comprises an upper platform adapted to support a load and comprising two plates 201, 202 joined together by reinforcing beams 203 to 205. Under the support platform for the load are articulated four legs on rollers or castors 206 to 209 which are automatically retracted to put the handling device in transporting position.

Under the support platform for the load are fixed two lifting bags 210, 211 and eight two-fold lifting air vessels 212 to 219. As will appear more clearly hereafter, the bags 210, 211 fulfil substantially the functions of the bags 142, 143 described in conjunction with FIGS. 13 to 16, whereas the air vessels 212 to 219 fulfil substantially the functions of the chamber 141 described in conjunction with the same FIGS.

Each air vessel is surrounded by a set of four cables, two of which, 220, 221, are seen in particular in FIGS. 22 to 24. These cables are anchored respectively at four points A B C D around each air vessel such as 212, on a junction plate 252 for joining to the support platform, and at four points A' B' C' D' arranged in the same way on a lower support such as 223 secured to the lower surface 224 of the handling device, namely the surface by which the latter rests upon the ground.

The device also comprises four pneumatic traction means 225 to 228 arranged at 90° from one another, the said traction means fulfilling substantially the functions of the traction means 168, 166 described in conjunction with FIGS. 13 to 16.

Of course the traction means 227, 228 act in opposite directions, as well as the traction means 225, 226, the actions of these pairs of traction means being perpendicular to one another, whereby a reversible bidirectional handling device is obtained as mentioned hereabove.

Each traction means comprises an anchoring bar 229 to 232 fixed to the underside of the support platform for the load and another bar 233 to 236 to which are anchored traction cables 237, 238 and 239, 240 respectively, acting in mutually opposite directions and having their lower ends anchored to the lower face 224 of the handling device resting upon the ground. This appears more clearly in FIG. 19.

FIG. 19 shows in particular the chamber 241 of the traction means 225 and an anchor 242 of the cable 237 on the lower surface 224 by which the device rests upon the ground. The pull action on the cable 237 is obtained by inflating the chamber 241 of the traction means 225 around which are wound flexible members such as straps 243 having their ends fixed respectively to the bars 229 and 233. At 225' is shown the deflated position of the traction means, wherein the lower anchorage point of the cable 237 is at 242' whereas at 225'' is shown the fully inflated position of the traction means, wherein the lower anchorage point of the cable 237 is at 242''. A flexible link 244 passing through the beam 205 retains the traction means in a suspended position under the support platform.

Finally, flexible links such as nylon cords 245 sustain the middle part of the lower enclosure 224 under the beam 205.

FIG. 18 shows more clearly the construction and arrangement of the air vessels 212 to 219. Each air vessel such as 212 comprises two superposed half-vessels 246, 247 communicating with each other through a central opening 248. An inlet mouth for the inflation of the air vessels is shown at 249. The air vessels are mounted on the flexible lower surface 224 of the handling device through the medium of a support 250 preventing in particular the mouth 249 from injuring the enclosure 224. The air vessels bear by their upper faces upon an intermediary plate 252 through the medium of a plate 251, and the intermediary plate 252 bears upon the under face of the support platform for the load. The support plate 251 is provided with a flange 251a which sealingly bears upon the plate 252. Further, an escape opening 253 small in diameter connects the air vessels to a cavity 254 provided between the plate 251 and the plate 252.

The handling device just described is operated as follows.

First the handling device is moved under a load placed for instance on a support such as a plate 6 resting upon two legs 14, 15 (FIG. 1), by pushing the handling device, for instance manually by means of a lever 255, by making it roll on its articulated legs 206 to 209 provided with rollers. At that time the bags 210, 211 as well as the air vessels 212 to 219 are deflated whereby the handling device assumes the subsided position schematically illustrated in FIG. 20.

After the handling device has thus been placed under the load, the lifting bags 210, 211 are inflated, whereby the load resting upon its supports is parted from the ground. Simultaneously, the articulated legs on rollers are retracted. This phase of the operation is schematically illustrated in FIG. 22. The handling device and the load are now ready to be moved in any of the four directions Ox, Ox', Oy or Oy' as schematically shown in FIG. 21. Assuming for instance that it is desired to move the handling device in the direction Ox, pressure is applied to the traction means 225 and 226. These traction forces of equal magnitude and opposed in direction cause the handling device to be centered on the axis x'x. The anchoring cables surrounding each air vessel are thus stretched in a vertical plane parallel to the direction x'x as shown in FIG. 22.

In a third phase of motion pressure is applied to the traction means 228 while no pressure is applied to the traction means 227 yet. The traction force applied to the cables 240 causes the bottom enclosure 224 of the handling device to slip on the floor in the direction Ox as shown in FIG. 22.

In a fourth phase of motion pressure is applied to the lifting air vessels 212 to 219. Since the raising stroke of these air vessels exceeds that step the lifting bags 210, 211, the load is raised further and the bags part from the ground. The anchoring cables such as 220, 221 are straightened and assume a vertical position while remaining in a vertical plane parallel to the axis x'x. Of course the bottom 224 of the handling device bearing upon the ground does not move. On the contrary in the intermediate plate 252 between the support platform for the load and the support plate such as 251 of the air vessels slide on the said support plates and move forward by half a step. This sliding motion of the plate 252 on the plates 251 takes place without notable friction owing to the air pads which appears between the support plate 251 and the plate 252 as a result of the leakage effect produced by the gauged opening 253 communicating with the inflated air vessels. At the end of this fourth phase of operations, the handling device assumes the position schematically illustrated in FIG. 23. At this time, while the bags 210, 211 and the air vessels 212 to 219 remain inflated the pressures in the traction means 227, 228, are reversed to set the traction means 228 to exhaust and to apply pressure to the traction means 227. This results in a slackening of the cables 240 and, on the contrary, a stretching of the cables 239, thus tending to incline the latter in the direction Ox as shown in FIG. 24.

In a sixth phase of the operations, the air vessels are progressively deflated while keeping the traction means 227 under pressure. The load moves down until the lifting bags come into contact with the ground and this down motion is accompanied by a further motion of translation by half a step in the direction Ox as shown in FIG. 21.

At this time where remains only, in a seventh phase of operations, to reverse the pressures in the traction means 227, 228, whereby the bottom 224 of the handling device slips on the ground and the handling device assumes the position it had during the third phase of motion.

The operations just described are summarized in the following table:

| Phase of operation | Pressure, kg./cm.² | | | | | | Position of handling device |
|---|---|---|---|---|---|---|---|
| | Air | | Traction means | | | | |
| | Bags, B | Vessels, V | 225 | 226 | 227 | 228 | |
| 1 | 0 | 0 | 0 | 0 | 0 | 0 | Resting position. |
| 2 | 0↗5 | 0 | 0↗2 | 0↗2 | 0 | 0 | Raising from the ground. |
| 3 | 5 | 0 | 2 | 2 | 0 | 0↗2 | The bottom slips on the ground. |
| 4 | 5 | 0↗7 | 2 | 2 | 0 | 2 | Raising of the bags and translation of the load by half a step. |
| 5 | 5 | 7 | 2 | 2 | 0↗2 | 2↘0 | Reversal of the inclination of the cables. |
| 6 | 5 | 7↘5 | 2 | 2 | 2 | 0 | Lowering of the load and further translation by half a step. |
| 7 | 5 | 5↘0 | 2 | 2 | 2↘0 | 0↗2 | The handling device is put under the same conditions as in 3. |

The inflation pressures for the lifting vessels, the lifting bags and the traction means are provided by stages so as to allow the same fluid to be used to operate successively the vessels, the bags and the traction means. For instance the vessels may be inflated at 7 kg/cm$^2$, the bags at 5 kg/cm$^2$, the traction means at 2 kg/cm$^2$. Since the faces of inflation of the traction means do not follow automatically upon the faces of deflation of the traction means, the lifting bags are used as intermediate storage chambers. Thus, the compressed air provided by a conventional type of compressor is used in the best possible way.

In FIG. 25 is schematically shown a power control system for the handling device, adapted to meet the above mentioned requirements.

Pressurized feed air flows through a pressure regulator 260 which keeps the pressure in the conduit 261 at 7 kg/cm$^2$. This conduit leads to the eight lifting vessels V of the handling device. A slide valve 262 controls either the application of pressure to the vessels at 7 kg/cm$^2$ or their deflation, by means of a control circuit 263. The deflation of the vessels is accomplished in two stages:

from 7 kg/cm$^2$ to 5 kg/cm$^2$ by means of a slide valve 264 controlled by a control circuit 265 when the conduit 261 is connected to the conduit 266 and 267 leading to a conduit 268 disposed downstream with respect to a pressure regulator 269 which reduces the pressure to 5 kg/cm$^2$; and from 5 kg/cm$^2$ to 0 kg./cm.$^2$, when the slide valve 264 sets the conduit 266 to exhaust through 270. kb/cm$^2$ The 5 kg./cm.$^2$ pressure circuit feeding the lifting bags B receives the pressurized air through a conduit 268 and through a conduit 271 placed downstream with respect to a regulator 269. A pressure regulator 272 which reduces the pressure to 2 kg./cm.$^2$ allows the four traction means 273 to 276 to be fed at all times from the lifting bags B, each of the said traction means being controlled by a slide valve 273 to 276 which is in turn controlled by control circuits 277 to 280.

As for the lifting bags B, they are controlled by a slide valve 281 which is in turn controlled by a circuit 282.

Of course, the invention should not be construed as being limited to the form of embodiment described and illustrated herein, which has only been given by way of example. In particular, it covers all the means which are technically equivalent to the means described as well as their combinations, should the latter be within the scope of the invention.

We claim:

1. A handling device for the transportation of loads of the type comprising inflatable chambers interposed between the load and the ground wherein are provided:
   at least two substantially parallel surfaces, one of which is adapted to receive the load, and the other is adapted to bear upon the ground;
   inextensible members linking said two surfaces at articulation points;
   means for sequentially inflating or deflating said chambers; and
   means which, in the deflated state of the said chambers, control the shifting of the said surfaces with respect to one another through shifting of the said points of articulation with respect to one another.

2. A device according to claim 1, wherein the articulation points of said inextensible members are distributed correspondingly on the said two surfaces, so that the latter are articulated in the same way as two opposite parallel faces of a parallelogram.

3. A device according to claim 2, wherein said chambers are located between said two parallel surfaces and bear against the same.

4. A device according to claim 3 wherein at least two of the said inflatable chambers are provided, the inflation of one of them allowing to lift the load to a certain height and the inflation of the other allowing to lift the load higher.

5. A device according to claim 3 wherein at least one of the said chambers to which a moderate pressure is applied comprises air vessels of small volume interposed between the said two surfaces, and fixed to the surface bearing upon the ground, said air vessels being adapted, when inflated, to move the load receiving surface to a distance by bearing upon the said surface through the medium of a support plate, an air film being provided between the said support plate and the said surface by means of leakage air taken from the inflating air of the said vessels.

6. A device according to claim 5, wherein a chamber comprises air bags inflated to a pressure less than the pressure of the said vessels.

7. A device according to claim 6, wherein conduits, pressure regulators and other control means connect said vessels to said bags and said bags to said traction means which are of fluid actuated type.

8. A device according to claim 1, wherein said means controlling the relative shifting motion of the two surfaces are traction means.

9. A device according to claim 8, wherein said traction means are fluid-actuated traction means.

10. A device according to claim 8, wherein at least four traction means are arranged at 90° from one another, each of the said traction means ensuring a relative displacement in one of the following four directions: forward, backward, to the left or to the right, of one of the said surfaces with respect to the other.

11. A method of load handling a displacement at a small distance from the ground, wherein between the load and the ground is interposed a device comprising a support surface for the load and a surface bearing upon the ground, said surfaces are linked by inextensible links, and inflatable chambers are provided, which when inflated, are capable of moving the said surfaces apart, comprising the steps of:
   slipping said bearing surface on the ground under the said support surface in the desired direction of displacement;
   inflating said chambers to move the said surfaces apart and lift the load, the said bearing surface resting upon the ground and the said support surface moving along an arc of a circle while simultaneously stretching said links; and
   deflating said chambers while preventing the said support surface from moving backward with respect to the said bearing surface.

12. A method according to claim 11, wherein simultaneously with the deflation of the chambers urging the support surface to continue its motion of translation in the direction initiated with the lift of the load.

13. A method according to claim 12, consisting in inflating the said chambers to moderate pressure, and then deflating said chambers into lifting air bags inflated to a little lower pressure, and using the pressurized air stocked in said air bags at a lower pressure in fluid-actuated traction means, in order to control the sequential motions of translation of said two surfaces with respect to one another.

14. A method according to claim 11, consisting in inflating the said chambers to moderate pressure, and then deflating said chambers into lifting air bags inflated to a little lower pressure, and using the pressurized air stocked in said air bags at a lower pressure in fluid-actuated traction means, in order to control the sequential motions of translation of said two surfaces with respect to one another.

UNITED STATES PATENT OFFICE
CERTIFICATE OF CORRECTION

Patent No. 3,537,540      Dated Nov. 3, 1970

Inventor(s) Paul Zuppiger and Gabriel Bouladon

It is certified that error appears in the above-identified patent and that said Letters Patent are hereby corrected as shown below:

Column 5, line 17, after "sequence" insert: ---$H\bar{B}\bar{H}B$---;

line 18, "$H\bar{B}\bar{H}B$" should read --$DG\bar{D}\bar{G}$--- line 19, "$DG\bar{D}\bar{G}$" should read ---$GD\bar{G}\bar{D}$---

Column 6, line 35, insert ---$\vec{x}$--- after "translation";

line 40, "$GD\bar{G}\bar{D}$" should read ---$2\vec{x}$---

Column 8, line 6, "step" should read ---of---;

line 15, insert ---$\vec{x}$--- after "step"

line 34, insert ---$\vec{x}$--- after "step"

line 36, "where" should read ---there---.

SIGNED AND SEALED

FEB 23 1971

(SEAL)
Attest:

Edward M. Fletcher, Jr.
Attesting Officer

WILLIAM E. SCHUYLER, JR.
Commissioner of Patents